(12) United States Patent
Porten et al.

(10) Patent No.: US 8,844,499 B2
(45) Date of Patent: Sep. 30, 2014

(54) METHOD AND APPARATUS FOR DETERMINING AND REGULATING AN EXHAUST GAS RECIRCULATION RATE OF AN INTERNAL COMBUSTION ENGINE

(75) Inventors: Guido Porten, Vaihingn/Enz (DE); Markus Amler, Leonberg-Gebersheim (DE); Lanouar Chouk, Marbach (DE); Jan-Mathias Meng, Ludwigsburg (DE); Uwe Mueller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 767 days.

(21) Appl. No.: 12/944,343

(22) Filed: Nov. 11, 2010

(65) Prior Publication Data
US 2011/0118959 A1   May 19, 2011

(30) Foreign Application Priority Data
Nov. 13, 2009  (DE) .......................... 10 2009 046 701

(51) Int. Cl.
*F02P 5/00*     (2006.01)
*F02M 25/07*    (2006.01)

(52) U.S. Cl.
CPC ....... *F02M 25/0728* (2013.01); *F02M 25/0707* (2013.01); *F02M 25/0713* (2013.01); *Y02T 10/121* (2013.01)
USPC ................. 123/406.48; 123/568.23; 701/108

(58) Field of Classification Search
USPC .......... 123/406.48, 434, 435, 568.11, 568.21, 123/568.23
See application file for complete search history.

(56) References Cited

U.S. PATENT DOCUMENTS

| | | | | |
|---|---|---|---|---|
| 4,391,248 A | * | 7/1983 | Latsch | 123/406.42 |
| 4,417,556 A | * | 11/1983 | Latsch | 123/406.42 |
| 4,462,376 A | * | 7/1984 | Ripper et al. | 123/676 |
| 6,230,697 B1 | * | 5/2001 | Itoyama et al. | 123/568.21 |
| 6,256,575 B1 | * | 7/2001 | Sans | 701/102 |
| 2007/0250252 A1 | * | 10/2007 | Jehle et al. | 701/105 |

* cited by examiner

*Primary Examiner* — John Kwon
(74) *Attorney, Agent, or Firm* — Kenyon & Kenyon LLP

(57) ABSTRACT

The invention relates to a method and an apparatus for determining an exhaust gas recirculation rate in an internal combustion engine, in which the exhaust gas recirculation rate indicates a proportion of exhaust gas in a gas quantity delivered to a cylinder of the internal combustion engine, and combustion takes place in the cylinder of the engine cyclically during a combustion phase. The method includes the steps of ascertaining a combustion course statement over the course of combustion in the cylinder of the engine, and ascertaining an actual exhaust gas recirculation rate from the combustion course statement with the aid of a predetermined exhaust gas recirculation rate function. The invention further relates to a method and an apparatus for regulating an exhaust gas recirculation rate in an internal combustion engine, in which the exhaust gas recirculation rate indicates a proportion of exhaust gas in a gas quantity delivered to a cylinder of the internal combustion engine, and combustion takes place in the cylinder of the engine cyclically during a combustion phase. The method includes the steps of ascertaining a combustion course statement over the course of combustion in the cylinder of the engine, furnishing a set-point statement as a function of an operating point of the engine, and performing a regulation to compensate for a deviation that results from the set-point statement and the combustion course statement.

10 Claims, 3 Drawing Sheets

METHOD AND APPARATUS FOR DETERMINING AND REGULATING AN EXHAUST GAS RECIRCULATION RATE OF AN INTERNAL COMBUSTION ENGINE

CROSS-REFERENCE TO RELATED APPLICATION

This application is based on German Patent Application 10 2009 046 701.7 filed on Nov. 13, 2009.

BACKGROUND OF THE INVENTION

1. Field of the Invention

The invention relates to instant of ignitions having exhaust gas recirculation. In particular, the present invention relates to the determination or regulation of an exhaust gas recirculation rate in an instant of ignition.

2. Description of the Prior Art

In lean-operated engines, for instance in engines with a stratified charge, there is an air excess in the combustion chamber of each cylinder. Because of the lean mode of operation, engines can be operated with greater efficiency. However, a lean mode of operation leads to increased emissions of nitrogen oxide, which as a rule exceeds the applicable limits for nitrogen oxide. To reduce nitrogen oxide emissions, an external exhaust gas recirculation is therefore provided, in which some of the exhaust gas produced in the engine is returned to the intake tube of the engine in order to be introduced there into the cylinders of the engine again.

In optimizing nitrogen oxide emissions, an exhaust gas quantity determined by an operating point has to be returned. As a rule, this quantity is represented by what is called an exhaust gas recirculation rate, which indicates the proportion of exhaust gas in the fresh air delivered. Metering the returned exhaust gas quantity is typically done in pilot-controlled fashion, taking into account a location feedback of the inlet valves used for the exhaust gas recirculation.

Since the exhaust gas recirculation rate cannot be measured directly, until now it has had to be calculated using a suitable model. This modeled exhaust gas recirculation rate is then used for regulating the exhaust gas recirculation rate to a set-point value defined by an operating point. Calculating the quantity of exhaust gas actually returned to the cylinder is done on the basis of a pressure sensor and air flow rate-based balancing of the inflowing and outflowing quantities of air and exhaust gas. In the fully unthrottled mode of engine operation, which is preferentially assumed in a lean mode of operation, the erroneous variations of this modeling of the actually returned exhaust gas quantity, or the actual exhaust gas recirculation rate, rise sharply.

Particularly in the lean mode of the engine, the combustion properties worsen drastically with an increasing exhaust gas recirculation rate, and even at exhaust gas recirculation rates elevated only slightly above the predetermined set-point value lead to combustion misfires. If the actually delivered exhaust gas recirculation rates drop below the exhaust gas recirculation rates that are optimal for attaining minimum nitrogen oxide expulsion, then the nitrogen oxide emissions rise disproportionately, which leads to a marked disadvantage in terms of fuel consumption, because of the necessity of more-frequent regeneration of the nitrogen oxide storage-type catalytic converters employed.

OBJECT AND SUMMARY OF THE INVENTION

It is therefore an object of the present invention to make a method and an apparatus for determining an exhaust gas recirculation rate available in which the variations in the exhaust gas recirculation rate are slight. It is also an object of the present invention to make a method and an apparatus for regulating an exhaust gas recirculation rate in an instant of ignition available, in which deviations from a predetermined set-point value for the exhaust gas recirculation rate can be reduced.

These objects are attained by the method for determining an exhaust gas recirculation rate and by the method for regulating the exhaust gas recirculation rate as well as by the apparatuses according to the invention.

In a first aspect, a method for determining an exhaust gas recirculation rate in an internal combustion engine is provided, in which the exhaust gas recirculation rate indicates a proportion of exhaust gas in a gas quantity delivered to a cylinder of the internal combustion engine, and combustion takes place in the cylinder of the engine cyclically during a combustion phase. The method includes the following steps:

ascertaining a combustion course statement over the course of combustion in the cylinder of the engine; and ascertaining an actual exhaust gas recirculation rate from the combustion course statement with the aid of a predetermined exhaust gas recirculation rate function.

For determining the exhaust gas recirculation rate, it can also be provided that the exhaust gas recirculation rate function takes into account at least one further combustion course statement of the engine, in particular an rpm of the engine, the requested torque demanded by the driver, and a statement about the fuel quantity.

In a further aspect, a method for regulating an exhaust gas recirculation rate in an internal combustion engine is provided, in which the exhaust gas recirculation rate indicates a proportion of exhaust gas in a gas quantity delivered to a cylinder of the internal combustion engine, and combustion takes place in the cylinder of the engine cyclically during a combustion phase. The method includes the following steps:

ascertaining a combustion course statement over the course of combustion in the cylinder of the engine;

furnishing a set-point statement as a function of an operating point of the engine; and performing a regulation to compensate for a deviation that results from the set-point statement and the combustion course statement.

A concept of the present invention comprises determining and/or regulating the exhaust gas recirculation rate from a statement about the course of combustion in the cylinder. The invention is based on the observation that there is an exponential relationship between the exhaust gas recirculation rate and the course of combustion, in particular the ignition lag, or in other words the time between stoppages of the ignition spark and the center point of combustion of the combustion tripped as a result. By ascertaining the combustion course statement, which characterizes the course of combustion or in other words the location over time of the combustion and the duration of the combustion, a statement about the existing exhaust gas recirculation rate can thus be obtained. The course of combustion can be detected for instance via a direct measurement of the combustion chamber pressure with the aid of a combustion chamber pressure sensor. As a result, on the one hand the exhaust gas recirculation rate can be determined via the combustion course statement, or on the other, it can be regulated to a predetermined value.

It can also be provided that the set-point statement, which corresponds to a statement of a set-point exhaust gas recirculation rate, is ascertained from a set-point characteristic diagram as a function of one or more mode status variables, in particular an rpm and/or a requested torque demanded by the driver, and the actual exhaust gas recirculation rate is ascertained from the combustion course statement with the aid of an exhaust gas recirculation rate function.

In an alternative embodiment, the set-point statement can correspond to a statement of a set-point combustion location, in particular to a set-point ignition lag or to a set-point center point of combustion and is ascertained from a set-point characteristic diagram as a function of one or more mode status variables, in particular an rpm and/or a requested torque demanded by the driver, and a statement of a combustion location is ascertained as a combustion course statement.

Moreover, a combustion chamber pressure in the cylinder can be measured, and the combustion course statement is ascertained as the instant of the local maximum of the course of a combustion chamber pressure statement during a combustion phase in the cylinder.

Alternatively, the combustion course statement can indicate a statement of a center point of combustion, and a combustion chamber pressure in the cylinder is measured, and the course of a combustion chamber pressure statement corresponding to the combustion chamber pressure, in particular the differential heating course, is integrated during the combustion phase in order to obtain an integral heating value, and the center point of combustion corresponds to the instant at which the integral heating value corresponds to half of the final value of the integral heating value (MFB 50%) that results upon integration over one complete combustion phase in the cylinder.

In one embodiment, the combustion course statement can be ascertained as a function of an instant of ignition, which indicates an instant of the tripping of an ignition spark in a combustion chamber of the cylinder, so that an ignition lag is furnished as a combustion course statement.

In a further aspect, an apparatus for determining an exhaust gas recirculation rate in an internal combustion engine is provided, in which the exhaust gas recirculation rate indicates a proportion of exhaust gas in a gas quantity delivered to a cylinder of the internal combustion engine, and combustion takes place in the cylinder of the engine cyclically during a combustion phase. The apparatus includes the following:

a detector, in particular a combustion chamber pressure sensor, for ascertaining a variable indicating the course of combustion in the cylinder of the engine, as a combustion course statement; and a control unit for ascertaining an actual exhaust gas recirculation rate from the combustion course statement with the aid of a predetermined exhaust gas recirculation rate function.

In a further aspect, an apparatus for regulating an exhaust gas recirculation rate in an internal combustion engine is provided, in which the exhaust gas recirculation rate indicates a proportion of exhaust gas in a gas quantity delivered to a cylinder of the internal combustion engine, including:

detector, in particular a combustion chamber pressure sensor, for ascertaining a variable indicating the course of combustion in the cylinder of the engine, as a combustion course statement; and a control unit, for furnishing a set-point statement as a function of an operating point of the engine; and for performing a regulation for compensating for a deviation that results from the set-point statement and the combustion course statement.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
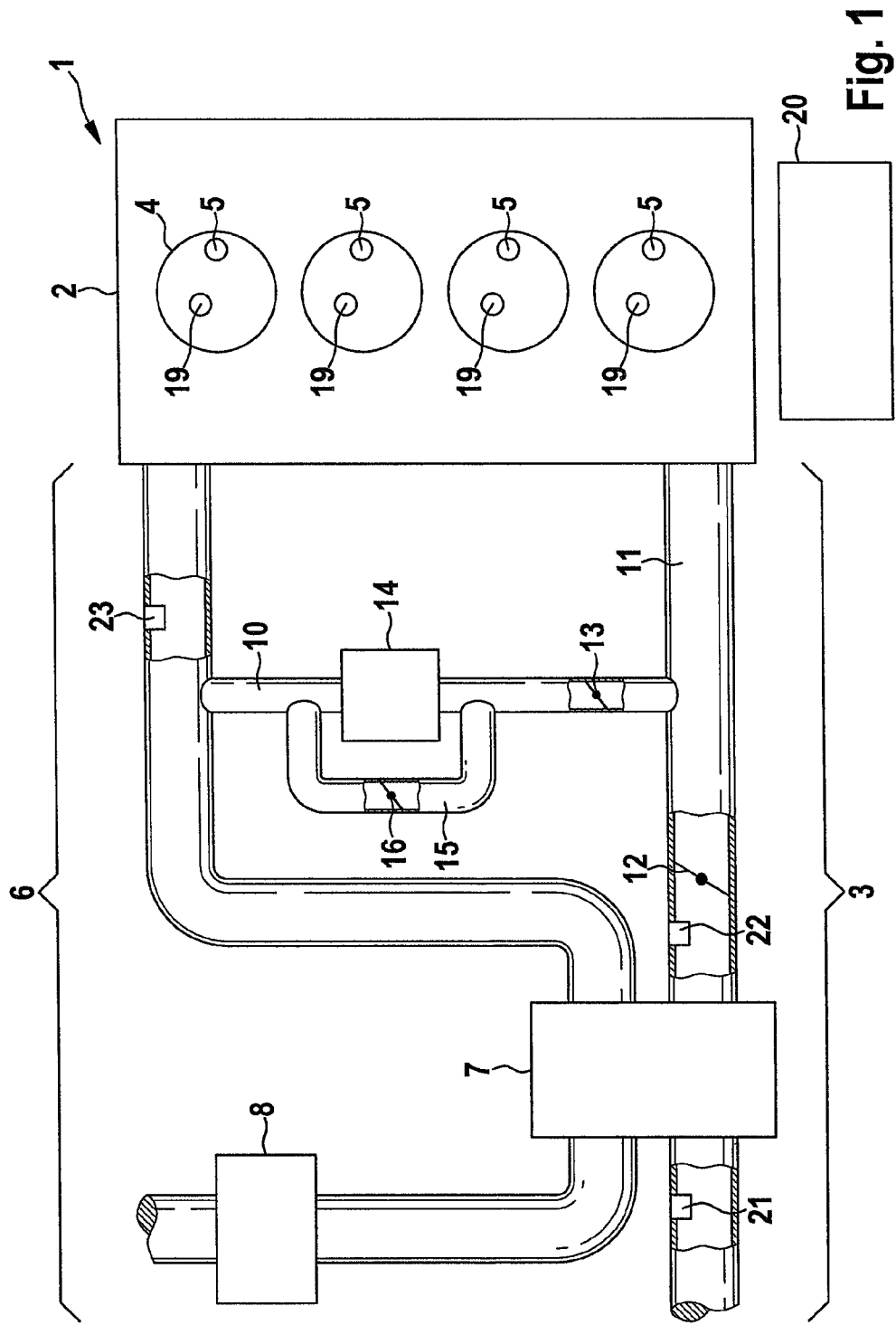
FIG. 1 is a schematic illustration of an instant of ignition with exhaust gas recirculation.

FIG. 1 shows a schematic illustration of an engine system 1 having an instant of ignition 2, to which air is delivered via an air delivery portion 3. The engine 2 is embodied as a direct injection Otto engine and has one or more cylinders 4, in which an injection valve 5 is provided for injecting fuel.

An exhaust gas extraction section 6 is also provided, for carrying combustion exhaust gases away from the cylinders 4. In the exhaust gas extraction section 6, there is a turbine of an exhaust gas turbocharger 7, for driving a compressor in the air delivery section 3 by means of the exhaust gas enthalpy. With the aid of the compressor, air can be made available at a charge pressure. Air is introduced into the cylinders 4 through inlet valves (not shown) and expelled into the exhaust gas extraction section 6 through outlet valves (not shown).

A nitrogen oxide storage-type catalytic converter 8 is disposed downstream of the turbine of the exhaust gas turbocharger 7. The nitrogen oxide storage-type catalytic converter 8 reduces nitrogen oxides to nitrogen and $CO_2$.

An exhaust gas recirculation line 10 is provided, which connects the exhaust gas extraction section 6 upstream of the turbine of the exhaust gas turbocharger 7 with an intake tube portion 11 that is provided between a throttle valve 12 and the inlet valves of the cylinders 4. The exhaust gas recirculation line 10 includes an exhaust gas recirculation valve 13, with which the quantity of recirculated exhaust gas can be adjusted. An exhaust gas cooler 14 is also disposed in the exhaust gas recirculation line 10; its efficiency is adjustable by means of an optional bypass line 15 that short-circuits the exhaust gas cooler 14. An adjustable bypass valve 16 is disposed in the bypass line 15, and as a result the cooling action (efficiency) of the exhaust gas cooler 14 can be adjusted.

The engine system 1 is operated with the aid of a control unit 20. To that end, the control unit 20 triggers actuators of the engine system 1. In particular, depending on the predetermined desired torque and other predetermined variables, the control unit 20 can adjust the compression output of the exhaust gas turbocharger 7 (for instance by way of an adjustment of a variable turbine geometry), the position of the throttle valve 12, the position of the exhaust gas recirculation valve 13, the position of the bypass valve 16, the injection instants and durations during which fuel is injected through the injection valves 5 into the cylinders 4 and which determine the injected fuel quantity, and the function of the inlet valves and outlet valves as a function of a position of the camshaft (not shown). The system status variables required for the control and regulation actions are detected via suitable detectors. For detecting the system status variables, the control unit 20 can for instance ascertain an air flow rate flowing into the air delivery section 3 with the aid of an air flow rate sensor 21, the charge pressure in a portion of the air delivery section between the exhaust gas turbocharger 7 and the throttle valve 12 with the aid of a charge pressure sensor 22, and the exhaust gas temperature upstream of the turbine of the exhaust gas turbocharger 7 with the aid of an exhaust gas temperature sensor 23, and from that can determine the controlling variables for the actuators mentioned above.

It is possible to operate such Otto engines in the lean mode, in which air excess (lambda value>1) prevails in the cylinders. The torque is adjusted solely via the fuel quantity. In this kind of mode of operation, the throttle valve 12 is virtually completely open. The exhaust gas recirculation rate, which indicates the quantity of exhaust gas that is mixed with the fresh air flowing through the intake tube, is modeled with the aid of parameters, such as the air flow rate upstream of the exhaust gas turbocharger, the charge pressure, the exhaust gas temperature, and the like. If the throttle valve 12 is nearly completely open, the errors in the modeling (determination) of the exhaust gas recirculation rate rise sharply relative to the actual (real) exhaust gas recirculation rate.

Since an erroneous ascertainment of the exhaust gas recirculation rate can lead to an assumption of an overly high or overly low exhaust gas recirculation rate relative to the actual exhaust gas recirculation rate, the result can be impaired operating properties of the engine if a regulation action is based on the ascertained exhaust gas recirculation rate. As a result, the actual exhaust gas recirculation rate can deviate from the set-point exhaust gas recirculation rate. If the exhaust gas recirculation rate is overly high, the combustion properties worsen considerably, while if the exhaust gas recirculation rate drops below the set-point exhaust gas recirculation rate, the nitrogen oxide emissions rise disproportionately sharply. This leads to a pronounced disadvantage in terms of fuel consumption, since the nitrogen oxide storage-type catalytic converter 8 must be regenerated more often. The regeneration of the nitrogen oxide storage-type catalytic converter 8 is done by delivering uncombusted fuel, which is used for reducing the nitrogen oxides.

Since a direct measurement of the quantity of exhaust gas in the fresh air delivered to the cylinders is not possible, it is proposed that the exhaust gas recirculation rate be determined from combustion parameters, or that at least a qualitative statement is made about an increase or decrease in the exhaust gas recirculation rate. To that end, it is proposed that a combustion parameter be selected which characterizes a course of combustion. As an example for the combustion parameter, the center point of combustion in the cylinders 4, or in a representative cylinder 4, can be ascertained.

Figure 2:
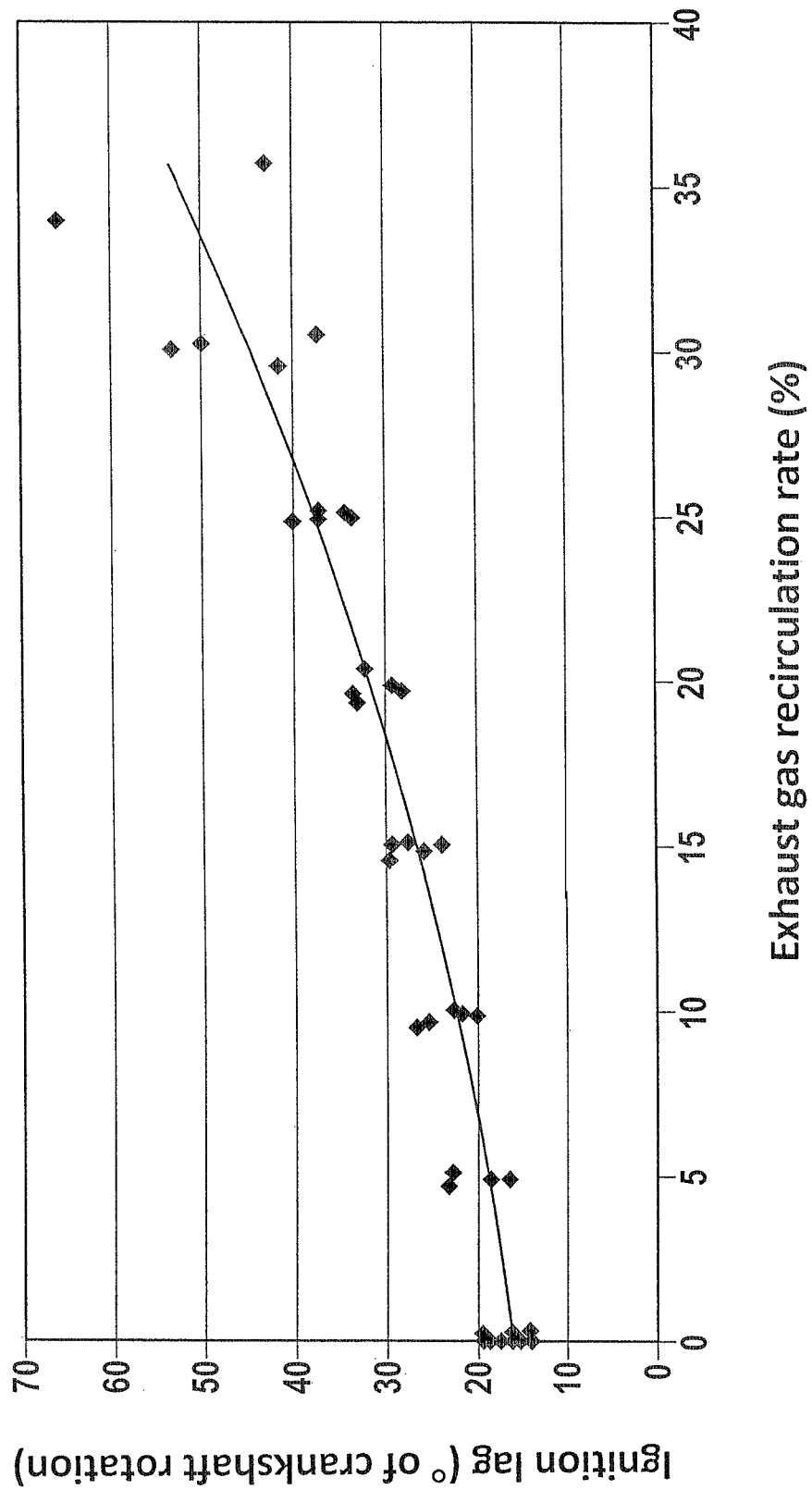
FIG. 2 is an illustration of a dependency between an ignition lag and the exhaust gas recirculation rate.

As can be seen from FIG. 2, an ignition lag, that is, the length of time between the stoppage of an ignition spark and the center point of combustion, or in other words the center point of the energy conversion of a resultant combustion in the applicable cylinders, depends on the actual exhaust gas recirculation rate. The course can be approximated by means of an exponential function. It can be appreciated that with various global engine exhaust gas recirculation rates, the combustion course in the combustion chambers of the cylinders will vary. For instance, if the exhaust gas recirculation rate is increased sharply, the ignition of the mixture is delayed more and more markedly, which results in a later location of the center point of combustion, and vice versa.

For determining the center point of combustion, a combustion chamber pressure sensor 19 (FIG. 1), which continuously detects the applicable combustion chamber pressure, can be provided in the cylinders 4. From the course of the combustion chamber pressure, the differential heating course can be ascertained in the control unit 20, for instance based on a smoothed combustion chamber pressure signal. The differential heating course can then be integrated into an integral heating value over a period of time during which the combustion takes place (for instance from the instant of the stoppage of the ignition spark until the end of combustion, but at the latest upon attainment of bottom dead center of a motion of a piston in the combustion chamber of the cylinder), and the instant at which the integration value for the integration of the differential heating course has reached half of the integral heating value attained for the entire combustion can be assumed as the center point of combustion. Still other methods for ascertaining a statement about a center point of combustion can also be employed.

As an alternative combustion course statement that characterizes the course of combustion, a local combustion chamber pressure maximum can also be ascertained. This assessment can be performed for instance in the control unit 20, to which statements of the actual combustion chamber pressure at the time are furnished. The control unit 20 monitors the course of the combustion chamber pressure and, as the center point of combustion, it can for instance ascertain the instant at which the local maximum of the combustion chamber pressure is reached.

From the ignition lag, with the aid of an exhaust gas recirculation rate function stored in memory, for instance in the form of a look-up table or of an exhaust gas recirculation rate characteristic diagram, or the like, the exhaust gas recirculation rate can be ascertained. The exhaust gas recirculation rate characteristic diagram, with which the exhaust gas recirculation rate is associated with the applicable ignition lag, can take further parameters into account, such as an rpm of the engine, the requested torque demanded by the driver, a type and quality of fuel, and the like.

Alternatively, the combustion course statement ascertained by the control unit 20, in particular, or the ignition lag resulting from the center point of combustion can also be employed for regulating the exhaust gas recirculation rate to a constant working point. As a rule, the exhaust gas recirculation rate is adjusted by a pilot controller based on a corresponding pilot control characteristic diagram. Corrections in the thus-adjusted exhaust gas recirculation rate can be made by monitoring the combustion quality, by means of taking correction factors into account.

Figure 3:
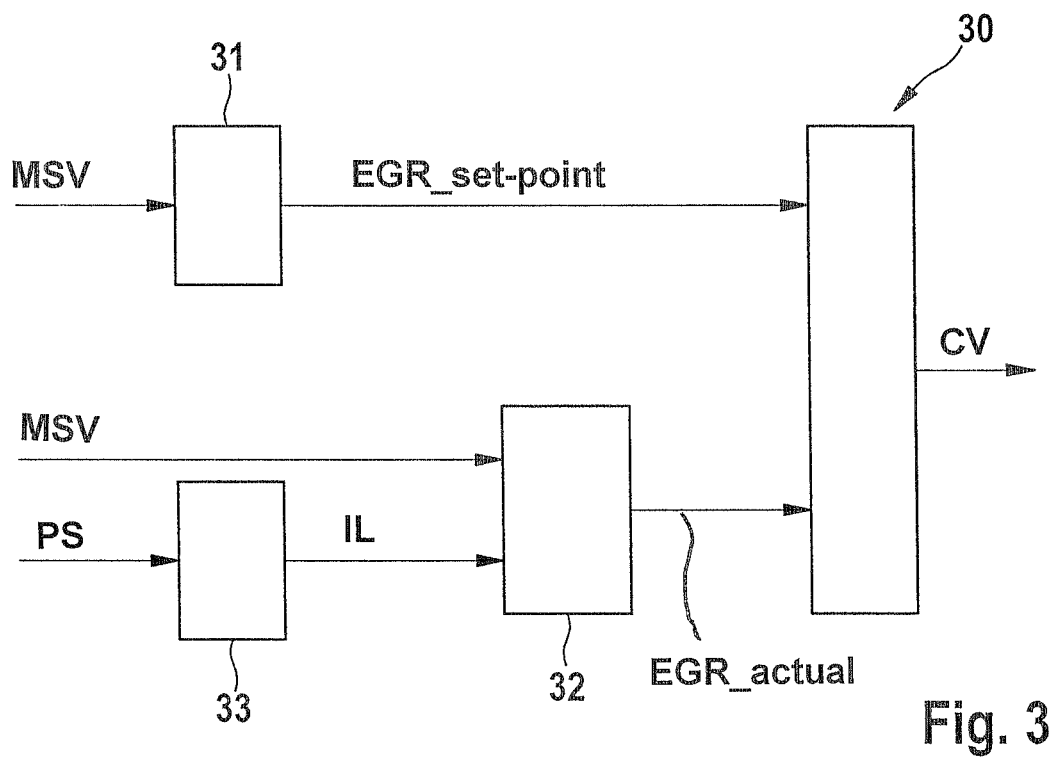
FIG. 3 is a schematic illustration of regulating the exhaust gas recirculation rate in one embodiment.

As schematically shown in FIG. 3, a regulator 30 of the exhaust gas recirculation rate, with which the exhaust gas recirculation rate is regulated to a set-point exhaust gas recirculation rate ERG_set-point indicated by a set-point characteristic diagram 31, can be implemented, preferably in the control unit 20. As a feedback variable for the regulation action, the ignition lag IL resulting from the combustion chamber pressure signal PS in accordance with a combustion course statement function 33 can be employed. With the aid of the exhaust gas recirculation rate characteristic diagram 32, the actual exhaust gas recirculation rate ERG_actual can be ascertained from the ignition lag IL. This actual exhaust gas recirculation rate is ascertained as described above, further taking into account such mode status variables MSV as the rpm of the engine, the engine load, the type of fuel, and the like. The set-point exhaust gas recirculation rate ERG_set-point and the actual exhaust gas recirculation rate ERG_actual are delivered to a regulator 34, which in a regulation action ascertains one or more controlling variables CV for operating the engine 2. As regulators, proportional, differential and integral components can be combined in a suitable way. Possible controlling variables CV of the control unit 20 for intervention into the operation of the engine 2 are variables which pertain to a position of the throttle valve 12, a position of the exhaust gas recirculation valve 13, and a position of the camshaft.

With the aid of monitoring the ignition lag, an increase or reduction in the exhaust gas recirculation rate can also be easily recognized, and suitable steps can be taken for reducing or increasing the exhaust gas recirculation rate.

Figure 4:
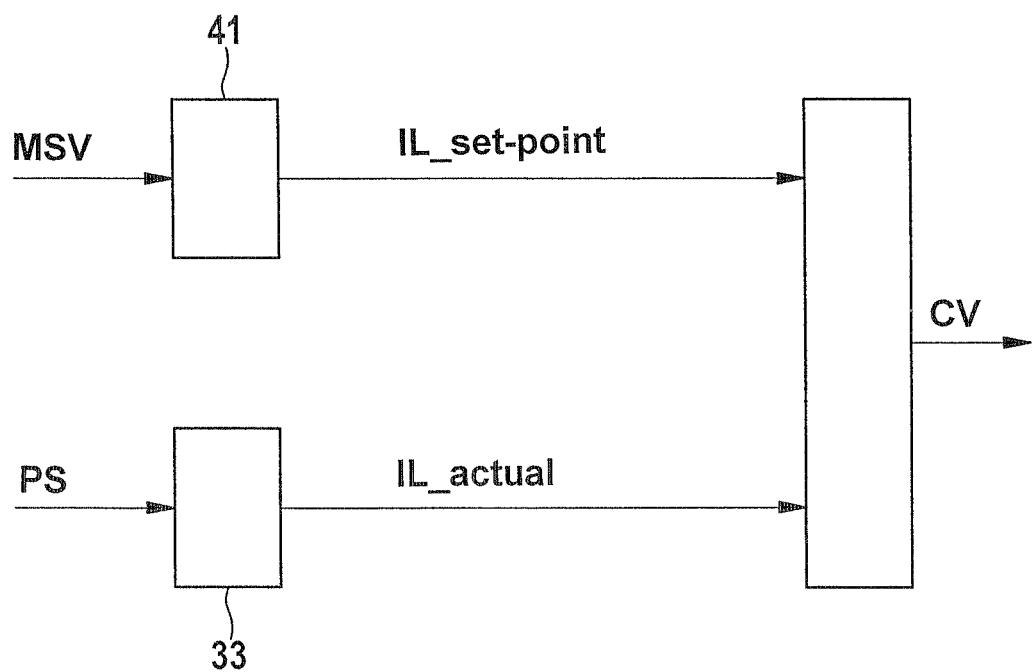
FIG. 4 is a schematic illustration of regulating the exhaust gas recirculation rate in a further embodiment.

In FIG. 4, a further embodiment for a regulator 40 of the exhaust gas recirculation rate is shown schematically. In contrast to the example in FIG. 3, in this embodiment the regulation is effected via the center point of combustion. To that end, an ignition lag model 41 is provided, which as a function of the above-described mode status variables ascertains a set-point value IL_set-point for the ignition lag and forwards it to a regulator 42. The combustion course statement function 33 is provided here as well, in order to ascertain a statement of an actual ignition lag IL_actual. Instead of the set-point ignition lag IL_set-point and the actual ignition lag IL_actual, suitable statements (set-point value, actual value) about the center point of combustion can also be ascertained and forwarded to the regulator 42. The regulator 42 is embodied essentially as described above and furnishes one or more controlling variables CV for operating the engine 2.

A computer program product can be provided which includes a program code which, when it is executed on a data processing unit, performs the method proposed by the invention, as will be understood by those skilled in the art.

The foregoing relates to preferred exemplary embodiments of the invention, it being understood that other variants and embodiments thereof are possible within the spirit and scope of the invention, the latter being defined by the appended claims.

The invention claimed is:

1. A method for regulating an exhaust gas recirculation rate in an internal combustion engine, which rate indicates a proportion of exhaust gas in a gas quantity delivered to a cylinder of the internal combustion engine, and combustion takes place in the cylinder of the engine cyclically during a combustion phase, having the following steps:
    ascertaining a combustion course statement that characterizes a course of combustion in the cylinder of the engine, wherein the combustion course statement is ascertained by measuring a combustion chamber pressure in the cylinder;
    furnishing a set-point statement as a function of an operating point of the engine; and
    performing a regulation of the exhaust gas recirculation rate to compensate for a deviation between a set-point value indicated by the set-point statement and an actual value that is one of indicated by and derived from the combustion course statement.

2. The method as defined by claim 1, wherein:
    the set-point value is a set-point exhaust gas recirculation rate ascertained from a set-point characteristic diagram as a function of one or more mode status variables that include at least one of an rpm and a requested torque demanded by the driver, and
    the actual value is an actual exhaust gas recirculation rate ascertained from a stored exhaust gas recirculation rate function that provides the actual exhaust gas recirculation rate based on an association between the actual exhaust gas recirculation rate and the combustion course statement.

3. The method as defined by claim 1, wherein:
    the set-point value is one of a set-point ignition lag and a set-point center point of combustion
    the set-point value is ascertained from a set-point characteristic diagram as a function of one or more mode status variables that include at least one of an rpm and a requested torque demanded by the driver, and
    a statement of a value corresponding to the set-point value is ascertained as the combustion course statement.

4. The method as defined by claim 1, wherein the combustion course statement is ascertained as an instant of the local maximum of a course of a combustion chamber pressure statement during a combustion phase in the cylinder.

5. The method as defined by claim 2, wherein the combustion course statement is ascertained as an instant of the local maximum of a course of a combustion chamber pressure statement during a combustion phase in the cylinder.

6. The method as defined by claim 1, wherein:
    the combustion course statement indicates a statement of a center point of combustion,
    a differential heating course is ascertained using the combustion chamber pressure and is integrated during the combustion phase to obtain an integral heating value, and
    the center point of combustion is determined as corresponding to the instant at which the integral heating value corresponds to half of a final value of the integral heating value that results upon integration over one complete combustion phase in the cylinder.

7. The method as defined by claim 2, wherein the combustion course statement indicates a statement of a center point of combustion,
    a differential heating course is ascertained using the combustion chamber pressure and is integrated during the combustion phase to obtain an integral heating value, and
    the center point of combustion is determined as corresponding to the instant at which the integral heating value corresponds to half of a final value of the integral heating value that results upon integration over one complete combustion phase in the cylinder.

8. The method as defined by claim 3, wherein the combustion course statement is ascertained as a function of an instant of ignition, which indicates an instant of tripping of an ignition spark in a combustion chamber of the cylinder, so that an ignition lag is furnished as a combustion course statement.

9. The method as defined by claim 5, wherein the combustion course statement is ascertained as a function of an instant of ignition, which indicates an instant of tripping of an ignition spark in a combustion chamber of the cylinder, so that an ignition lag is furnished as a combustion course statement.

10. An apparatus for regulating an exhaust gas recirculation rate in an internal combustion engine, which rate indicates a proportion of exhaust gas in a gas quantity delivered to a cylinder of the internal combustion engine, including:
    a combustion chamber pressure sensor that outputs a pressure signal from which a variable indicating the course of combustion in the cylinder of the engine is ascertained, as a combustion course statement; and
    a control unit that furnishes a set-point statement as a function of an operating point of the engine, and performs a regulation of the exhaust gas recirculation rate to compensate for a deviation between a set-point value indicated by the set-point statement and an actual value that is one of indicated by and derived from the combustion course statement.

* * * * *